United States Patent
Edwards

(10) Patent No.: US 11,948,257 B2
(45) Date of Patent: Apr. 2, 2024

(54) SYSTEMS AND METHODS FOR AUGMENTED REALITY VIDEO GENERATION

(71) Applicant: Rovi Guides, Inc., San Jose, CA (US)

(72) Inventor: Warren Keith Edwards, Atlanta, GA (US)

(73) Assignee: Rovi Guides, Inc., San Jose, CA (US)

(*) Notice: Subject to any disclaimer, the term of this patent is extended or adjusted under 35 U.S.C. 154(b) by 141 days.

(21) Appl. No.: 17/739,851

(22) Filed: May 9, 2022

(65) Prior Publication Data
US 2023/0360333 A1 Nov. 9, 2023

(51) Int. Cl.
| | |
|---|---|
| G06T 7/20 | (2017.01) |
| G06T 15/20 | (2011.01) |
| G06T 19/00 | (2011.01) |
| H04N 5/04 | (2006.01) |
| H04N 9/75 | (2006.01) |

(52) U.S. Cl.
CPC ............ *G06T 19/006* (2013.01); *G06T 15/20* (2013.01); *H04N 9/75* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 9,013,505 B1* | 4/2015 | Thornton | ................ | G06F 3/147 |
| | | | | 345/632 |
| 9,336,629 B2* | 5/2016 | Finn | ..................... | H04N 13/275 |
| 9,454,836 B2* | 9/2016 | Morinaga | ............... | G06T 11/60 |
| 10,176,643 B2* | 1/2019 | Hart | ........................ | G06F 3/011 |
| 10,657,721 B2* | 5/2020 | Yin | ........................ | G06T 19/006 |
| 10,845,188 B2* | 11/2020 | Weiss | ...................... | G01B 11/14 |
| 11,062,139 B2* | 7/2021 | Sheffield | ............. | G06F 16/9537 |
| 11,182,960 B2* | 11/2021 | Boivin | ................. | H04N 13/204 |
| 2003/0197779 A1* | 10/2003 | Zhang | .................... | H04N 7/144 |
| | | | | 348/14.09 |

(Continued)

FOREIGN PATENT DOCUMENTS

KR 20180130911 A 12/2018

OTHER PUBLICATIONS

"AR Creation Tools", https://developer.apple.com/augmented-reality/tools/, retrieved on Jul. 13, 2022.

(Continued)

*Primary Examiner* — Martin Mushambo
(74) *Attorney, Agent, or Firm* — Haley Guiliano LLP

(57) ABSTRACT

Systems and methods are described for generating an AR image are described herein. A physical camera is used to capture a video of a physical object in front of a physical background. The system then accesses data defining a virtual environment and selects a first position of a virtual camera in the virtual environment. While capturing the video, the system displays captured video of the physical object, such that the physical background is replaced with a view of the virtual environment from the first position of the virtual camera. In response to detecting a movement of the physical camera, the system selects a second position of the virtual camera in the virtual environment based on the detected movement. The system then displays the captured video of the physical object, wherein the view of the physical background is replaced with a view of the virtual environment from the second position of the virtual camera.

20 Claims, 10 Drawing Sheets

(56) References Cited

U.S. PATENT DOCUMENTS

| | | | |
|---|---|---|---|
| 2005/0035980 A1* | 2/2005 | Lonsing | G06T 15/00 345/633 |
| 2007/0236514 A1* | 10/2007 | Agusanto | G06T 19/006 345/646 |
| 2011/0304611 A1* | 12/2011 | Suzuki | G06T 15/04 345/582 |
| 2014/0098179 A1* | 4/2014 | Moore | H04N 13/368 348/E7.083 |
| 2014/0316611 A1* | 10/2014 | Parente Da Silva | G06T 7/70 701/2 |
| 2015/0084951 A1* | 3/2015 | Boivin | H04N 23/80 345/419 |
| 2015/0195443 A1* | 7/2015 | Dal Mutto | H04N 5/2628 348/211.11 |
| 2015/0304531 A1* | 10/2015 | Rodriguez Garcia | H04N 5/2224 345/419 |
| 2019/0102943 A1* | 4/2019 | Fillhardt | G06T 15/00 |
| 2019/0297319 A1* | 9/2019 | Schmollgruber | H04N 13/271 |
| 2020/0074741 A1* | 3/2020 | Schulze | A63F 13/213 |
| 2020/0143592 A1 | 5/2020 | Cordes et al. | |
| 2021/0074014 A1* | 3/2021 | Kerr | G06T 19/006 |
| 2021/0304430 A1* | 9/2021 | Vendas Da Costa | G06T 7/579 |
| 2021/0366097 A1* | 11/2021 | Vendas Da Costa | G06T 7/0002 |
| 2022/0189058 A1* | 6/2022 | Kim | G06T 7/75 |

OTHER PUBLICATIONS

"AR Quick Look", https://developer.apple.com/augmented-reality/quick-look/, retrieved on Jul. 13, 2022.

"Chroma key", https://en.wikipedia.org/wiki/Chroma_key, retrieved on Jul. 13, 2022.

"Getting Started With ARDK", https://lightship.dev/docs/ardk/ardk_fundamentals/getting_started.html, retrieved on Jul. 13, 2022.

"RealityKit", https://developer.apple.com/augmented-reality/realitykit/, retrieved on Jul. 13, 2022.

"Snap AR—Lens Studio", https://ar.snap.com/lens-studio, retrieved on Jul. 13, 2022.

"User Manual Niantic Lightship", https://lightship.dev/docs/ardk/user_manual.html, retrieved on Jul. 13, 2022.

"Virtual camera Actor Quick Start", https://docs.unrealengine.com/4.27/en-US/AnimatingObjects/VirtualCamera/VirtualCameraActorQuickStart/, retrieved on Jul. 13, 2022.

Heaney, David , "How VR Positional Tracking Systems Work", https://uploadvr.com/how-vr-tracking-works/, retrieved on Jul. 13, 2022.

Kirkpatrick, Ficus , "AR Studio: Create and Distribute New, Rich AR Experiences with Ease", https://developers.facebook.com/blog/post/2018/05/01/ar-studio-create-distribute/, Mar. 1, 2018, retrieved on Jul. 13, 2022.

Lancial, Braxton , "The Basics: Niantic Lightship", https://lightship.dev/guides/lightship-basics/, retrieved on Jul. 13, 2022.

* cited by examiner

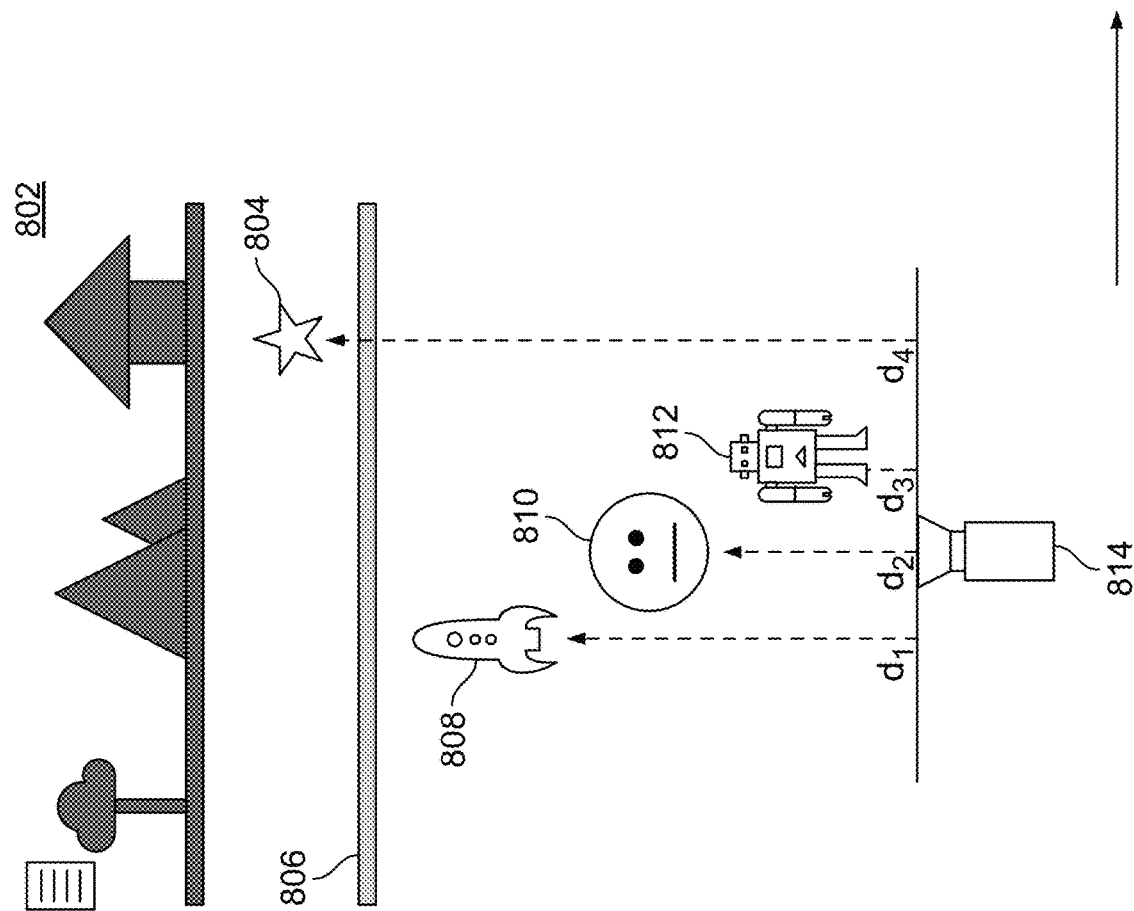
FIG. 8

SYSTEMS AND METHODS FOR AUGMENTED REALITY VIDEO GENERATION

BACKGROUND

This disclosure is directed to systems and methods for augmented reality image and video generation and in particular for modification of chromakey (e.g., green screen) background replacement based on movement of a physical camera.

SUMMARY

Tools for end-user video content creation are becoming increasingly powerful. In one approach video sharing platforms may provide features built into their applications (as well as extensive developer kits) that allow for a user interface that provides an option to quickly modify a video (e.g., before it's shared). For example, user interface options may be provided to create filters, add animated sprites, and even perform chroma key (background replacement) effects.

However, in such an approach visual effects tools merely mimic relatively low-end professional style tools, and do not take into account the ability of modern mobile devices to accurately determine and track changes in their positions and orientations in space with fine-grained resolution. In one approach, when chroma key is used, a green screen background may be replaced with computer-generated content using simple one-to-one pixel replacement, that does not take into account any motion of the camera, such as panning, zooming, or change of orientation.

Such approaches impose limits to the quality and types of visual effects that can be created. For example, these approaches often fail to account for changes in the physical camera's position and orientation and thus fail to achieve a realistic computer-generated background behind an object being filmed. That is, as the physical camera moves through a physical space, the rendered background scene is not updated accordingly as if a physical background set were being filmed. In such an approach the computer-generated background never moves with changes to physical camera position, but instead stays fixed within the camera's frame of reference.

In another approach, Augmented Reality (AR) authoring may allow for creation of content that is responsive to movement of physical camera. For example, when a mobile phone with a camera is panned around a room, the phone screen may display virtual objects superimposed over the real-world image, which stay fixed within the world's frame of reference (meaning that the positions of these virtual objects are being recalculated as the camera changes position and orientation). However, such AR effects are typically limited to foreground objects due to the difficulty of doing reliable background detection and replacement, as well as the difficulty of dealing with partially occluded virtual objects.

Accordingly, there is a need to expand the range of video creation tools to create sophisticated background visual effects that are responsive to camera motion, as well as to allow for integration of virtual foreground objects that can seamlessly change distance from the physical camera. Such a solution leverages the sophisticated motion tracking capabilities of cameras (e.g., of cameras in modern mobile devices) in order to create an improved augmented reality generation tool.

To solve these problems, systems and method are provided herein for creating video recordings that integrate complex computer-generated backgrounds and foregrounds in which the rendered scene is adjusted based on position and orientation of a physical camera. In some embodiments, computer-generated backgrounds and foregrounds are inserted in which the rendered scene is adjusted based on detected movement of physical actors and objects captured via the camera. This systems and methods provided herein create a mixed reality or AR-style presentation of the final video on a display or screen, combining computer-generated foreground and/or background objects with physical objects in the real-world environment.

In one approach, a physical camera is used to capture a video of a physical object in front of a physical background (e.g., a chroma key suitable background). An AR application may then access data defining a virtual environment (e.g., a 3D model stored in computer memory, for example as an FBX format file, OBJ former file, or any other suitable 3D definition format). The AR application may then select a first position of a virtual camera in the virtual environment (for example, this may be a preset or user selected point in the 3D model, e.g., in relation to pre-set reference point). While capturing the video, the AR application may display a captured video of the physical object, while replacing a view of the physical background with a view of the virtual environment from the first position of the virtual camera (e.g., by rendering the 3D model, for example by ray tracing, from the selected position of a virtual camera).

In response to detecting a movement (e.g., translation, panning, rotation, etc.) of the physical camera, the AR application selects a second position of the virtual camera in the virtual environment based on the detected movement. For example, the location of the virtual camera may be defined using 3D coordinate system (e.g., X, Y, Z coordinates with reference to some selected reference point.) The orientation of the virtual camera may be defined using roll, pitch, and yaw measurements relatives to a reference orientation. In one approach, orientation of the virtual camera may be defined using 6 values representing six degrees of freedom (6DOF). For example, the position of the virtual camera may move in relation to the 3D model (e.g., in relation to a reference point) in proportion (e.g., according to a scaling factor) to the movement of the physical camera in the real-world from a first location to a second location. In another example, the orientation change of the virtual camera in relation to the 3D model may mirror the orientation change of the physical camera in the real-world. The position (location or orientation) of the virtual camera may continuously be updated in a manner responsive to changes of position of the physical camera. The AR application may then display the captured video of the physical object, such that the view of the physical background is replaced with a view of the virtual environment from the second position or orientation of the virtual camera (e.g., that was created by rendering or ray tracing the 3D Model from the new selected position of a virtual camera). In one embodiment, as result, the AR application may leverage this technique to create realistic parallax effect in a virtual background that is being added the video.

In one approach, the AR application juxtaposes a real-world set with a computer-generated 3D Model by setting a reference point that indicates how the two environments should be aligned (e.g., via user interface). Further, the location of the physical camera (e.g., camera of a physical mobile phone) is established within the physical environment. The physical camera may then capture video frames in front of a green screen or other chroma key-compatible background (in some embodiments chroma key may be performed without a green screen, e.g., by detecting a human and replacing all other pixels). As filming proceeds, on a frame-by-frame basis, the position and orientation of the camera is tracked (e.g., via inertial measurement or other suitable techniques). This updated position/orientation information is then used to generate a new render of the computer-generated 3D Model from a perspective in the virtual environment that corresponds to the location of the physical camera. This render is then substituted into the background (e.g., via chroma key replacement).

In another embodiment, AR application may receive via a user interface data specifying a set of computer-generated foreground objects (e.g., 3D objects) that may be integrated into the scene and which may appear in front of both the background and any physical objects captured by the physical camera. These virtual foreground objects may each be defined by their own 3D models and may be associated with metadata that defines their virtual location within the virtual environment. On a frame-by-frame basis, as filming proceeds, the AR application evaluates the distances between the camera, any physical on-screen objects or actors, and the background. The AR application determines, based on the relative distances of these virtual objects, the positions where virtual foreground objects are rendered into the scene. Advantageously, the real-world objects may occlude or be occluded by the foreground objects depending on how close the real-world object is to the background.

Using the methods described herein, the AR application is able, by leveraging chroma key technology and on-device rendering, to perform high resolution inertial tracking of the physical camera to create AR images (or videos) that combine realistic and responsive background and foreground elements that integrate with physical actors and objects, and allow the creation of shots that move through a space.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 8 shows another exemplary implementation of augmented reality image generation, in accordance with some embodiments of this disclosure;

DETAILED DESCRIPTION

The term "physical camera" may refer to any suitable device capable of capturing the video content. For example, a physical camera may be a camera of a mobile phone with an integrated inertial measurement unit (IMU), and depth sensor. In another example, the physical camera may be any computing device capable of generating electric signals that represent detected light (e.g., using a complementary metal-oxide-semiconductor sensor and a lens).

The term "Virtual camera" may refer to a viewpoint or perspective in a virtual environment from which a 3D scene is rendered.

The term "physical background" may refer to a backdrop to which a physical camera is pointed to. In some examples, the physical background may be a physical screen painted a single color (e.g., green). In another example, the physical background may refer to all captured pixels by the physical camera other pixels of a detected image of a human face.

The term "background compositing" refers to any suitable process for replacing a physical background of a recorded scene (e.g., a green screen background) with computer generated effects.

The term "mid-field objects" refers to physical objects in front of the physical background In some embodiments, mid-field objects may be actors or other objects, which will appear to be located in front of or within the image generated through the background compositing.

The term virtual "foreground objects" may refer to virtual objects other than a physical background that are added to an image captured by the physical camera.

The term "foreground compositing" refers to any suitable process of adding computer-generated effects (e.g., addition of virtual foreground objects) either in front of mid-field objects (i.e., rendered over the top of them), or between mid-field objects and the background (such that they are occluded by the mid-field objects).

Figure 1:
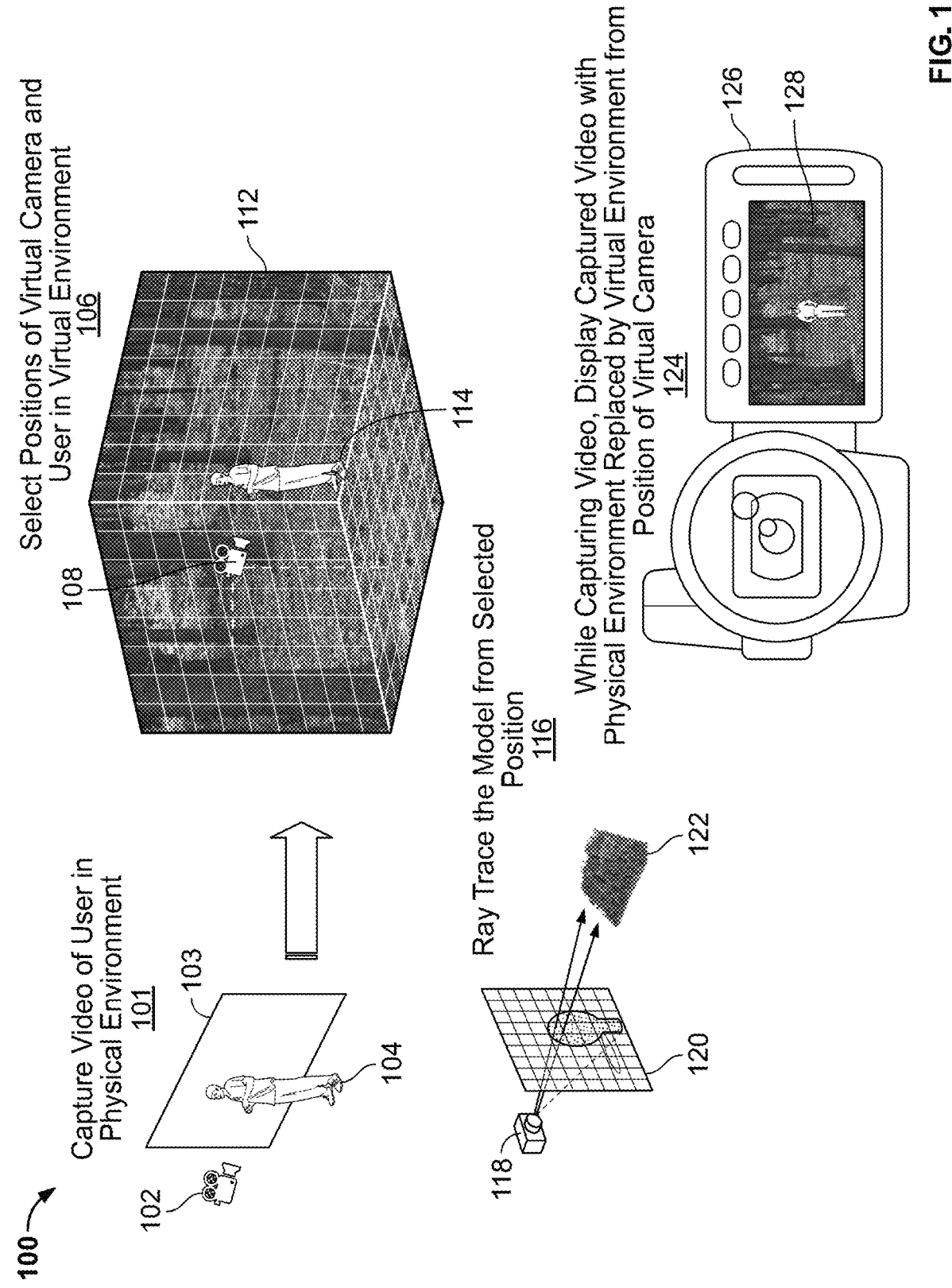
FIG. 1 shows an exemplary implementation of augmented reality image generation, in accordance with some embodiments of this disclosure.

FIG. 1 shows an exemplary implementation of augmented reality image generation, in accordance with some embodiments of this disclosure.

FIG. 1 shows a physical camera 102 (e.g., a camera of a smartphone). In some embodiments, the camera may be a part of or connected to a computing device that is configured to execute the AR application describe above and below. For example, the computing device may store instructions in non-transitory memory, that when executed by the processor of the computing, cause the computing device to execute the AR application to perform the methods described above and below.

Physical camera 102 may be configured to capture an image or video of a physical environment, that includes, for example a physical mid-field object (e.g. human body 104) in front of a background 103. In some embodiments, background 103 may be a solid color screen (e.g., green screen)

for chroma key replacement. In some embodiments, background 103 may be any other type of a physical background. For example, the AR application may dynamically identify pixels that represent human shape 104 and designate all other pixels as background pixels.

At 101, the AR application captures the video of at least one mid-field object 104 and background 103 using the physical camera 102. In some embodiments, the AR application captures other mid-field objects as well (not shown). At 106 the AR application access or constructs a virtual environment 112. As shown, virtual environment 112 shows a depiction of a forest 114, but any other suitable virtual environment 112 may be used.

For example, the virtual environment may be based on a full 3D model 122 stored as an FBX format file, OBJ former file, or any other suitable 3D modeling file. At 106 the AR application also sets the initial position of virtual camera 108. In some embodiment, the position may be set via a user interface. For example, the user interface may display a view of the virtual environment 112 (e.g., based on model 122). The user interface may also display UI elements for navigating the virtual environment 112 (e.g., zoom, rotation, scroll), and UI element for selecting the position and/or orientation of virtual camera 108. For example, UI elements may be used to drag, move or rotate with a mouse input an icon representing virtual camera 108.

Once set, the initial position of camera 108 may be associated with current position of physical camera 102 in the real world. In some embodiments, initial orientation of camera 108 may be also be associated with current orientation of physical camera 102 in the real world. In some embodiments, the AR application may then develop a data structure that maps a position of the physical camera 102 in the real world to a position of virtual camera 108 in the virtual environment 112. For example, the AR application may map movement of physical camera 102 1:1 to movement of camera virtual camera 108 in the virtual environment 112. In another embodiment AR application may map movement of physical camera 102 to movement of virtual camera 108 in the virtual environment 112 using a default or user selected scaling factor. For example, a 1:7 factor may be used, where 1 foot of movement in the real world corresponds to 7 feet of movement in the virtual environment 112. In some embodiments, the AR application may map movement of physical camera 102 to movement of virtual camera 108 in the virtual environment using a preset translation table, using any suitable translation mathematical formula, or in any other suitable fashion.

At 116, the AR application constructs a 2D image for display. For example, the AR application may perform rendering (e.g., by ray tracing) of 3D model 122 from virtual camera 108 position 118 to create projection 120. While technique shown at element 116 is a ray trashing rendering any other suitable rendering technique may also be used.

At 124, the AR application may perform replacement of background 103 with an 2D image 120 generated at step 118. For example, the AR application may perform a chroma key replacement of pixels of solid color wall 103. At the same time, the image of the mid-field object 104 (and any other mid-field object) is not replaced. As a result, the AR application displays (e.g. on display 126 of the computing device) a 2D image where an image of mid-field object 104 appears overlaid over a view of virtual environment 112. As more images are captured by camera 102, the steps may be repeated to display a video on display 126 of mid-field object 104 overlaid over a view of virtual environment 112 from the point of view of virtual camera 108.

Figure 2:
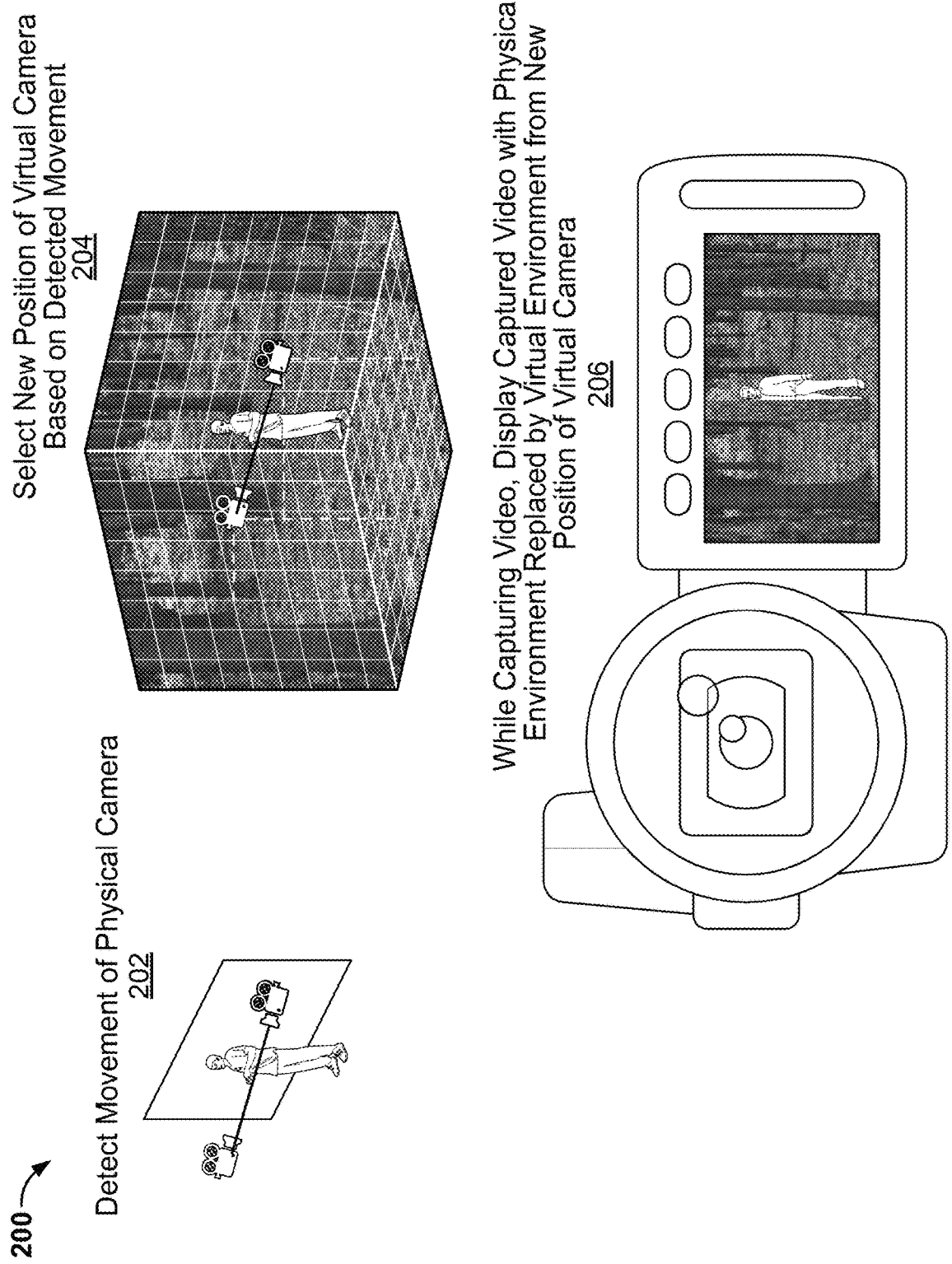
FIG. 2 shows another exemplary implementation of augmented reality image generation, in accordance with some embodiments of this disclosure.

FIG. 2 shows another exemplary implementation of augmented reality image generation, in accordance with some embodiments of this disclosure.

In some embodiments, FIG. 2 shows continuation of methods described in FIG. 1. In particular, at 202, the AR application may detect a movement of physical camera 108 (e.g., using a gyroscope data, GPS data, fiducials data, or using any other suitable technique).

At 204, the AR application may select a new position for virtual camera 108 in virtual environment 112. The nature and scale of the movement may be based on a nature of the measured movement of physical camera 108. For example, rotation or tilt of physical camera 102 in the X, Y or Z directions (or combination thereof) may result in equal or scaled rotation or tilt of virtual camera 108 in the X, Y or Z axis in virtual environment 112. In another example, measured movement of physical camera 102 in the X, Y or Z axis (or combination thereof) may result in equal or scaled movement of virtual camera 108 in the X, Y or Z directions in virtual environment 112. In some embodiments, a new location of virtual camera 108 may be determined using a preset formula or data structure that takes as input measured movement of physical camera 102 and outputs the new virtual position or direction of movement of virtual camera 108 in virtual environment 112.

At 206, after the location of virtual camera 108 is changed, the AR application may create a new 2D image (e.g. by rendering, for example using ray tracing, the model 122 from a new position of virtual camera 108 in the virtual environment 112). The AR application may then perform replacement of background 103 with the newly generated 2D image. For example, the AR application may perform a chroma key replacement of solid color wall 103. At the same time, the image of the mid-field object 104 (and any other mid-field object) is not replaced. As a result, the AR application displays (e.g. on display 126 of the computing device) a 2D image where an image of mid-field object 104 appears overlaid over a view of virtual environment 112 from a new position. As more images are captured by camera 102, the steps may be repeated to display a video on display 126 of mid-field object 104 overlaid over a view of virtual environment 112 from a changing point of view of virtual camera 108.

In some embodiments, the AR application may also add one more foreground objects to the displayed image, that may appear in front or behind of an image of physical mid-field object 104 depending on how far the mid-field objects are from the background 103. For example, as shown, the AR application may insert an image of a tree (which is based on its own 3D model) partially obscuring an image of human body mid-field object 104 that itself appears in front of virtual background. In some embodiments, if the mid-field object was moved further away from the background 103, the tree, which is based on its own 3D model, may start appearing as occluded by an image of the mid-field object 104.

In some embodiment, the model 122 may be static or dynamic. For example, the model 122 may depict movement of the trees or any other event (e.g. on loop). In this case the chroma key replacement would be performed using a most current state of the state of model 122.

In some embodiment, the AR application may cause changes to the position of virtual camera 108 based on visual analysis of captured images on mid-field objects. For example, if the AR application detects certain gestures of human body, the position of virtual camera 108 may be changed. For example, if the human body 104 is detected to be walking, the position of virtual camera 108 may be moved. In another example, if the human body 104 is detected to perform certain hand gestures, the position of virtual camera 108 may be changed based on the detected gesture. For example, a hand rotation may cause a spin of virtual camera 108. In another example, a hand wave may cause forward movement of the position of virtual camera 108. Any suitable gesture may be mapped to any suitable movement of the virtual camera.

Figure 3:
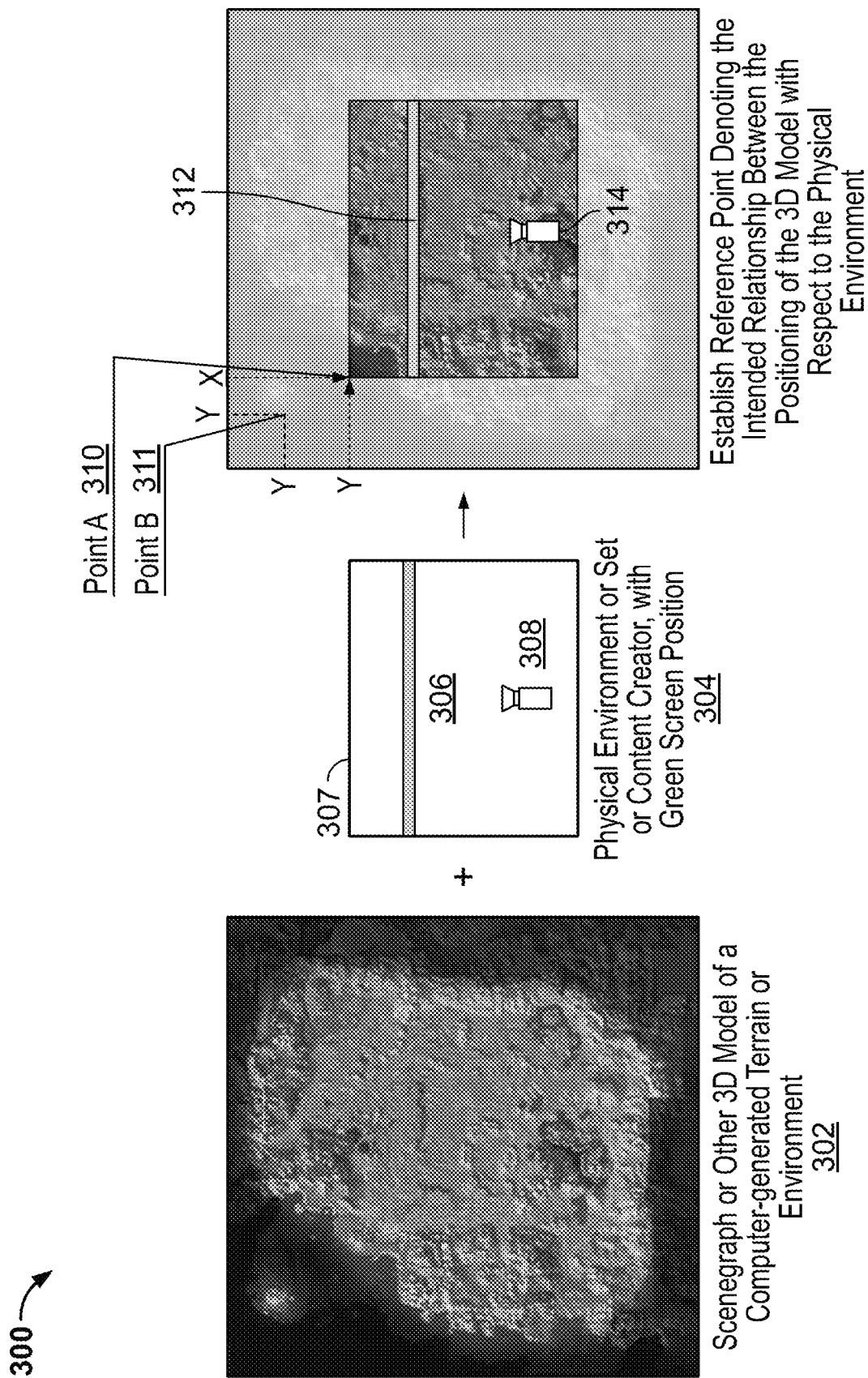
FIG. 3 shows another exemplary implementation of augmented reality image generation, in accordance with some embodiments of this disclosure.

FIG. 3 shows another exemplary implementation of augmented reality image generation, in accordance with some embodiments of this disclosure. In some embodiments, FIG. 3 shows another implementation of the method described above in connection with FIGS. and 2. For example, 3D model 302 may be used to improve green screen background replacement by an AR application. In particular, physical camera 308 may be positioned in from of screen 306 (e.g. a screen of solid color such as green designed to simplify chroma key replacement). The AR application may establish reference point 310 that is used to establish a relationship between physical of camera 308 and virtual environment defined by 3D model 302. In some embodiments, camera 308 is the same as camera 102, 3D model 302 is the same as model 122, and green screen 306 is the same as physical background 103.

Many effects-heavy visual productions rely on a combination of background visual effects that are generated by a computing device (such as a virtual set or landscape), physical actors and objects in front of those background effects, and foreground visual effects such as computer-generated content that appears in front of the actors.

In one approach background visual effects are inserted into a scene using chroma key technology. Chroma key approach is achieved by filming actors in front of a solid screen (e.g., green screen) which is then replaced by computer-generated effects rendered in post-production. Chroma key may be used in a static manner and responsive manner. Static chroma key relies on the following factors: 1) the physical camera position stays fixed throughout the capture of vide by AR applications, and 2) the computer-generated background content's placement is fixed within the frame. This makes for less expensive production, since the physical camera's position need not be tracked, and a single version of the background effects can be rendered. In this approach, the computer-generated content is always rendered by the AR application at the same location and same perspective in the frame, regardless of any movements or shift the physical camera.

Responsive chroma key relies on the following factors: 1) the physical camera may move dramatically during filming, as actors move or the action proceeds, and 2) the rendered background must be updated in response to camera movement such that the rendered background scene is aligned, both spatially and temporally, with the camera movement in order to create the illusion of a physical set. Notably, the view provided by a camera lens or screen is not what the final shot will looks like. Because the visual effects are time consuming to render, they are created after the actors are shot, and added in post-production. This means that the view provided by a camera lens or screen during the shooting only shows the actors in front of a green screen, without any view of either background or foreground effects.

In this responsive chroma key approach, pre-visualizations of scenes are done during pre-production, typically as storyboards or quick animated mockups of scenes, in order for the end user to manually decide how best to compose and film the shot. From this pre-visualization, the end user manually programs a sequence of timed camera motions that are carried out as actors perform in front of the green screen, and this same motion sequence is also used to generate a rendered background that is synchronized to the camera movements.

The responsive chroma key approach is highly inflexible and expensive for the following reasons: 1) since camera motions are developed and programmed based on earlier pre-visualizations, there's limited opportunity to change the filming angles or blocking positions on the set; 2) even if the end user does decide to adjust camera motion, the result is not visible on user interface of the physical camera (because it depends on fully rendered background effects only created during post-production), and 3) foreground VFX elements are not visible while filming.

In another approach, rather than performing in front of a green screen, actors perform in a large, custom-built, light-controlled environment. Video effects are rendered in real-time and projected onto the walls of custom-built environment, which means that rather than being in an empty environment, actors can actually see the scenery around them, react to background events, and so forth. More importantly from the perspective of the content production, it means that both foreground and background elements are captured in-camera; if the camera is moved or repositioned, it captures a new perspective on background elements correctly—since they are actually rendered in the physical environment. This approach however is very expensive since it involved creation of custom sets.

To solve these problems, techniques are describe above and below that combine chroma key techniques with on-device rendering, fine-grained inertial tracking, and depth sensing techniques such as LIDAR to create an AR-based system that allows for creation of realistic virtual sets that integrate live actors and physical objects, along with foreground visual effects that can appear at varying distances from the camera. Such an arrangement not only enhances the abilities of end-user content creators, it also allows the easy scene composition, shooting, and previsualization UI without the need to build a custom-built set.

Described above and below are methods through which user interfaces are provided to enable creation of image and video recordings that integrate complex computer-generated backgrounds in which the rendered scene responds to the position and orientation of the camera; physical actors and objects captured via the camera; and/or to computer-generated foreground objects. This AR application creates an AR-style image or video presentation of the final video, combining computer-generated content in both the foreground and background with physical objects in the environment (e.g., mid-field objects).

In some embodiments, the AR application establishes a data object that tracks correspondence of a real-world environment with a computer-generated 3D environment, for example by setting a reference point that indicates how the two environments should be aligned by user interface input. Further, the location and or orientation of the physical camera (e.g., a camera of a mobile phone) may be established within the physical environment. For example, the location may be established using X, Y, Z coordinates and the orientation may be established using Pitch, Roll, Yaw measurements. Content is then filmed in front of a green screen or other chroma key-compatible background. As image capture by the physical camera proceeds, on a frame-by-frame basis, the position and orientation of the camera is tracked e.g., via inertial measurement (or other similar technique). This updated position/orientation information is then used to generate a new render of the computer-generated background from a perspective in the virtual environment that corresponds to the location of the physical camera, the render is then substituted by the AR application into the background via chroma key replacement.

In some embodiments, a user interface input may be used to specify a set of computer-generated foreground objects (e.g., 3D OBJ files) that should be integrated into the scene and which may appear in front of both the background and mid-field objects. These virtual foreground objects may be based on their own 3D models as well as a virtual location within the environment. On a frame-by-frame basis, as filming proceeds, the AR application may evaluate the distances between the camera, any physical on-screen objects or actors, and the background. Determined based on the relative distances of these objects, the virtual foreground objects are rendered into the scene by the AR application.

In this ways, the AR application leverages chroma key technology with on-device rendering, high resolution inertial tracking of the mobile device, and depth cameras or similar distance sensing technology to create images or videos that, in real time, combine realistic and responsive background and foreground elements that integrate with mid-field objects (e.g., physical actors and objects) to allow for creation of shots that move through a virtual environment.

In one embodiment, the AR application establishes a geometrical relationship between the physical environment where the physical camera (e.g., physical camera 308) is located and a virtual environment.

The AR application may establish the intended position of the computer-generated background environment with respect to the physical environment in which the shot will be recorded. In some embodiment, this position is not fixed, but may change throughout the duration of the video.

The AR application may establish the position of the physical camera within the physical environment. For example, AR application may determine an absolute position of physical positions (e.g., by establishing latitude and longitude of the physical camera, e.g., using GPS) or the physical positions relative to other elements in the physical set. The AR application may establish the orientation of the physical camera 304 in terms of roll, pitch, and yaw. The AR application may establish the initial position of the virtual camera (rendering viewpoint) 314 within the 3D model 302 that is used to generate the background scene.

In preparation for recording, the AR application may access a 3D model 302 or any other suitable 3D model (e.g., that depicts a castle, landscape, etc.). The 3D model may be selected via UI selection. The 3D model may be stored in any suitable format, such that it can be rendered from different virtual camera positions, creating an output image of the scene as if seen from that position. In one approach, 3D model 302 may be represented as a scene graph. In one approach, 3D model 302 might be rendered using a variety of techniques, including ray tracing or rasterization using vertex shaders (e.g. using Unreal engine techniques).

The AR application may establish a reference point 310 that denotes the spatial relationship between the 3D model 302 and physical environment where the physical camera 308 is located. For example, the reference point 310 may correspond to real location 307 in the physical world. For example, the location may be established using X, Y, Z coordinates.

3D model 302 may be a model of terrain accessed by the AR application. FIG. 3 depicts model 302 that is a model of a fantasy world map. In some any other 3D model may be used. The physical camera 307 may move in its physical environment, that include a green screen 306.

The reference point 310 denotes the relative location of where the physical environment should appear to be within the computer-generated environment. In the example shown here, an X,Y offset 310 indicates the positioning of the location of the physical location within this terrain map, providing a frame of reference for the rendering. The reference point 310 may correspond to real-world point 307. While 2 dimensions are shown by FIG. 3, the reference point may also be established in 3D coordinates of 3D model 302.

In some embodiments, 3D model 302 may be dynamic. That is, rather than representing a fixed landscape or environment, 3D model 302 may itself contain animated characters and other changes. These updates may happen on-the-fly while content is being captured, and thus must be reflected in the final rendering by the AR application.

The AR application may then establish initial location 314 for the virtual camera within this 3D model 302. Initial location 314 may indicate the perspective from which the scene will be rendered by the AR application, and it may be expressed in coordinates relative to the 3D model 302. In some embodiments, the initial virtual camera position 214 may or may not correspond to the initial location of the physical camera 308 within the physical set.

The AR applicational then determines a position and orientation of the physical camera 308 within the physical space. There are a variety of methods that can be used to determine location of a physical camera 308 within a limited physical area.

In one approach, the AR application uses fiducial tracking to determine a location of a physical camera 308. In this approach, visible markers with pre-defined geometric patterns are placed at known locations in the physical environment. The camera 308 then captures and decodes the fiducial markers to determine its own placement and orientation.

In another approach, the AR application uses magnetometer-based positioning to determine location of a physical camera 308. For example, the AR application may use a transmitter that generates an electromagnetic dipole field and a receiver attached to a tracked device.

In another approach, the AR application uses Ultra-Wideband (UWB)-relative positioning to determine location of a physical camera 308. UWB provides several-centimeter level of accuracy for devices in range; this allows a UWB receiver in a physical space to determine its position relative to a UWB transmitter in that space. If the transmitter is at a known location, then the position of the receiver within the space can be determined by the AR application.

In another approach, the AR application uses inertial dead reckoning. From a known starting position, the AR speciation can determine a location of the camera 308 within a space via dead reckoning based on readings from its inertial sensors (accelerometers). This strategy is simple and highly compatible with current mobile phones, and may use periodic recalibration.

In another approach, the AR application uses a GPS sensor to track the location of the camera 308. Any other suitable method to determine position of camera 308 may be used.

As computing device records images or video using camera 308, camera 308 may be oriented toward the green screen background 306. Mid-field elements such as actors or objects in the physical environment will occlude the green screen background. If chroma key technology is used, with each processed frame from the camera, the AR application can scan for pixels within some threshold range of the target chroma key color (such as green), and then replace that pixel with the pixel at the corresponding location from a set background image.

At runtime, the AR application transmits camera position and orientation relative to the reference point 310 to a computing device that executes a renderer application. In one example, the camera position and orientation relative to the reference point 310 are used by the AR application to update the virtual camera position within the renderer. The "virtual camera" is the point 314 within the 3D model 302 from which the rendering is computed by the AR application to capture a perspective from that location in the virtual scene (e.g. using ray tracing as shown by element 120 of FIG. 1 or any other rendering technique).

The virtual camera's position within the virtual environment may be offset from the corresponding position of the physical camera 308 within the physical environment, but move in a synchronized way as the physical camera 308 is moved (e.g. as explained in FIGS. 1 and 2). The completed render from the point 314 is then used by the AR application for chroma key background substitution. This process may be repeated frame-by-frame as either the camera 308 is moved or reoriented, or as the 3D model is updated.

In some embodiments, instead of using a 3D background 302, the AR application may rely on a 2D background for the background compositing. In this embodiments, the AR application detects movement of the physical camera 304 as described above. In response to the physical camera 304 movement in parallel to the green screen 306, the AR application pans or translates the virtual camera (e.g., in relation to the reference point 310 on the planar background) to create a new perspective on the background scene. Alternatively, or additionally, in response to the physical camera 304 movement closer or further to the green screen 306, the AP application zooms in or out to the 2D background. Alternatively, or additionally, in response to the physical camera 304 change in orientation, the AR application skews or alters the 2D background.

In some embodiments, the AR application may apply additional effects and enhancements based on a location of the virtual camera within the virtual environment. The AR application may process captured audio differently depending on the location of the virtual camera. For example, the AR application may modify sounds generated by objects in the AR background 302 depending on how close they are to the current location of the virtual camera. The AR application may also modify sounds based on characteristics of the specific current location of the virtual camera in the 3D model. For example, if the virtual camera is located in a large room defined by 3D model 302, the AR application may add suitable reverberation characteristics to the audio (e.g. audio associated with model 302 or audio captured by recorded in the real-world).

Figure 4:
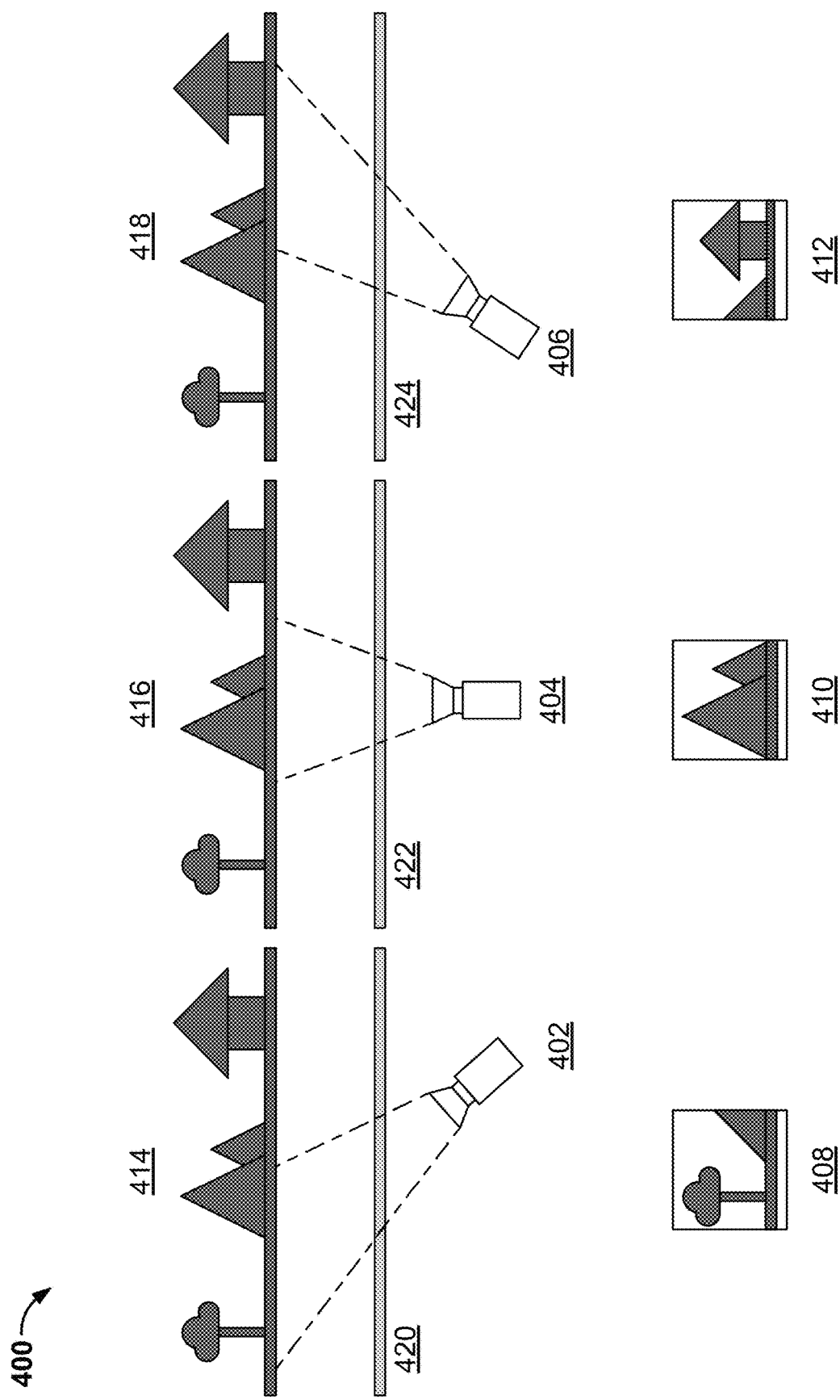
FIG. 4 shows another exemplary implementation of augmented reality image generation, in accordance with some embodiments of this disclosure.

FIG. 4 shows another exemplary implementation of augmented reality image generation, in accordance with some embodiments of this disclosure. In some embodiments, camera 402, 404, and 406 may be the same as camera 308 of FIG. 3. In particular, camera 403, 404, and 506 may be the same camera as it's being oriented at different angles with respect to the same green screen, 420, 422, and 424, respectively. 3D models 414, 416 and 418 may also be the same 3D model (e.g., model 302).

FIG. 4 shows rendering results 408, 410, and 412 from three different camera positions 402, 404, and 406. In each case, the overall 3D model of the background 414, 416, 418 is the same, and reflects the view into the virtual world established through the reference point (e.g., reference point 310 of FIG. 3). Depending on the camera orientation, different aspects of the computer-generated background would be visible in views 408, 410, and 412. The AR application may chroma key in views 408, 410, 412 instead of image of green screens 420, 422, and 424 at different times during filming. For example, as an angle of physical camera changes, the AR application may rotate the virtual camera in correspondence to the real rotation and create a parallax affect by replacing pixels of green screens 420, 422, and 424 successively with images 408, 410, and finally 412, In same embodiments, the AR application may decouple the rate of motion of the physical camera 308 in the physical environment from the rate of motion of virtual camera in the virtual environment. For example, the physical space may be only a small room, (e.g., 4 meters by 4 meters), yet the virtual environment represented by the 3D model 302 may be larger or smaller. For example, a 3D model 302 depicting some microscopic process may be many orders of magnitude smaller in scale than the physical room, while a fantasy landscape may be hundreds or even thousands of kilometers across.

To solve this problem, the AR application can use a scaling factor to map motions of the physical camera 308 in the physical environment to larger or smaller motions in the virtual environment. This allows small motions of the physical camera to map to larger movements of the virtual camera, and vice versa. A default 1:1 scaling factor used by the AR application would set equivalent rates of motion between the two spaces (and thus, movement within the virtual environment would be limited to the 4 meter×4 meter confines of the physical room), while a 1:2.5 scaling factor would mean that a 1 meter movement of the physical camera 308 would translated to a 2.5 meter movement of the virtual camera.

Further, in some embodiments, the AR application may dynamically update the reference point. For example, in a fantasy game simulation run by the AR application, a character may teleport to a new location within the computer-generated world. The AR may allow translation of the reference point 310 to new coordinates within 3D model 302 without corresponding movement of physical camera 308 (e.g. based on preset timing or UI input requesting the translation). In this way, the AR application may effectively change the origin point or offset that indicates the spatial correspondence between the physical set and its virtual location in the 3D model. Alternatively, the AR application may specify a transition between two reference points (point A 310 and point B 311) in the model 302, which comprises a path between A and B, potentially along with timing information that governs the speed of the transition between those locations, at any point along the path. Such a transition might be pre-programmed via user interface (such as to implement a fly-over of a virtual terrain) or it might be tied to some aspect of the 3D model (such as following a virtual character as it moves through the environment).

In this way, the AR application provides for either instantaneous or smooth movement through the virtual environment, without requiring motion of the physical camera 308. If the physical camera is also moved or reoriented during a transition, then the final background render reflects this change in position or orientation relative to the new reference point.

In yet another embodiment, the background 3D models 302 may be substituted at any point during the duration of the video by the AR application by another 3D model. This may be used to create a "teleportation" effect (moving to a different background city during a narrated travel guide to Europe, for example), or for performance reasons (e.g., segmenting a large, complex 3D model into multiple pieces that can be rendered more quickly, and then switching to an adjacent model as needed). These transitions may be tied to specific time points of the recording, or they may be triggered by the virtual camera or physical camera reaching a given position either in the virtual or physical environment, or by explicit user trigger (such as hitting a "transition" button on an editing console of the UI interface of the AR application), or through other computer process (such a simulation generating the model that transitions into a new state).

As a result, the AR application creates an augmented reality depiction combining real-world elements in the physical space with a computer-generated background that is responsive to physical camera motion 308 and orientation. In effect, the green screen background becomes a window onto the computer-generated background that accurately depicts what would be seen by a virtual camera in the 3D model 302, placed at a location determined by the placement of the real camera within the physical set. Further, the motion of the physical camera 302 can be decoupled by the AR application from that of the virtual camera, allowing for capture and recording of background visuals at a variety of scales, and supporting programmed movement through the virtual space.

In some embodiments, the AR applications may display the final image, on a frame-by-frame basis, on one or more additional display devices. For example, the AR application may cast the live video to a remote display device allowing a user to more easily see the live shot being produced.

Figure 5:
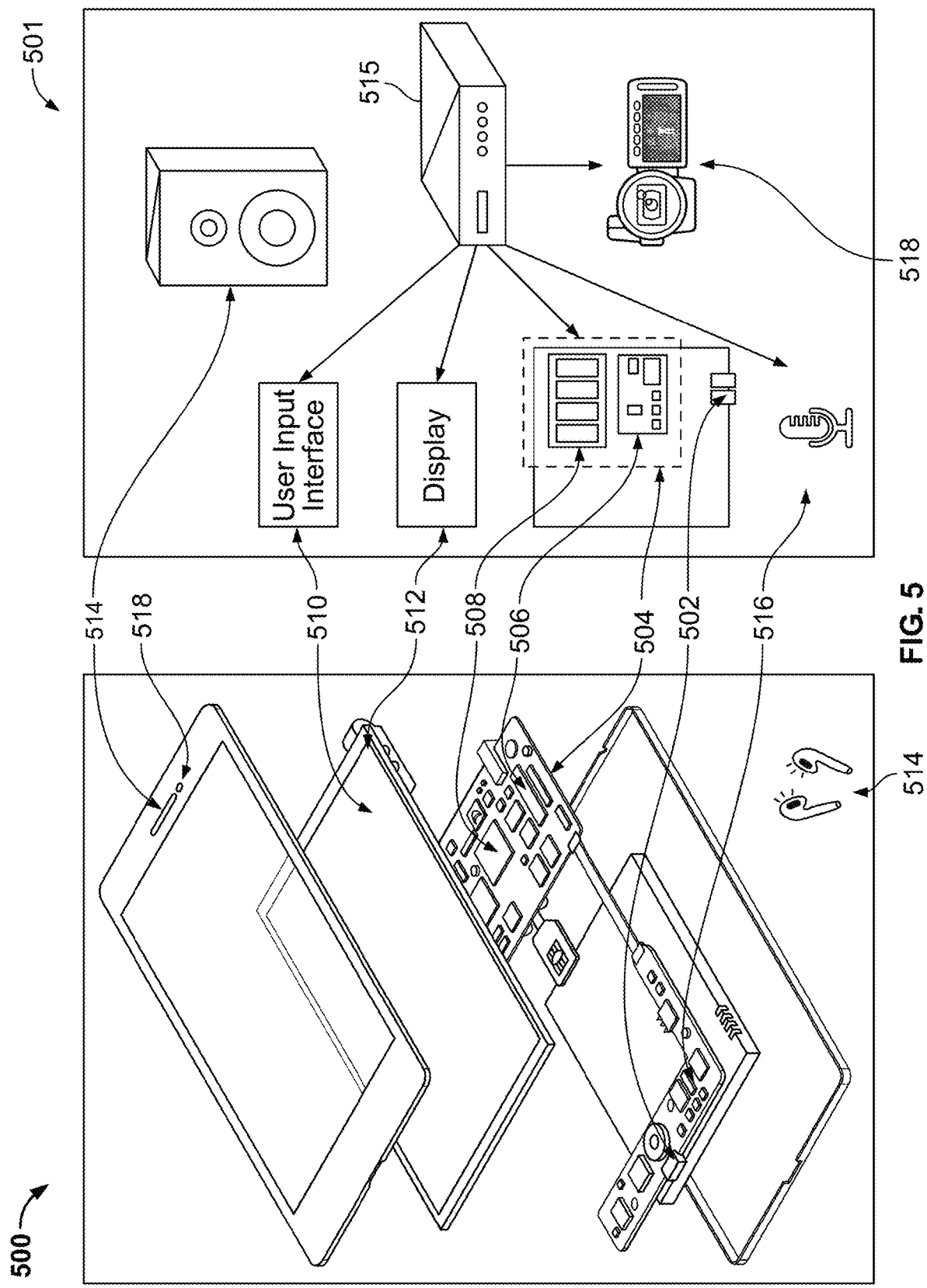
FIG. 5 shows an illustrative computing device, in accordance with some embodiments of this disclosure.
Figure 6:
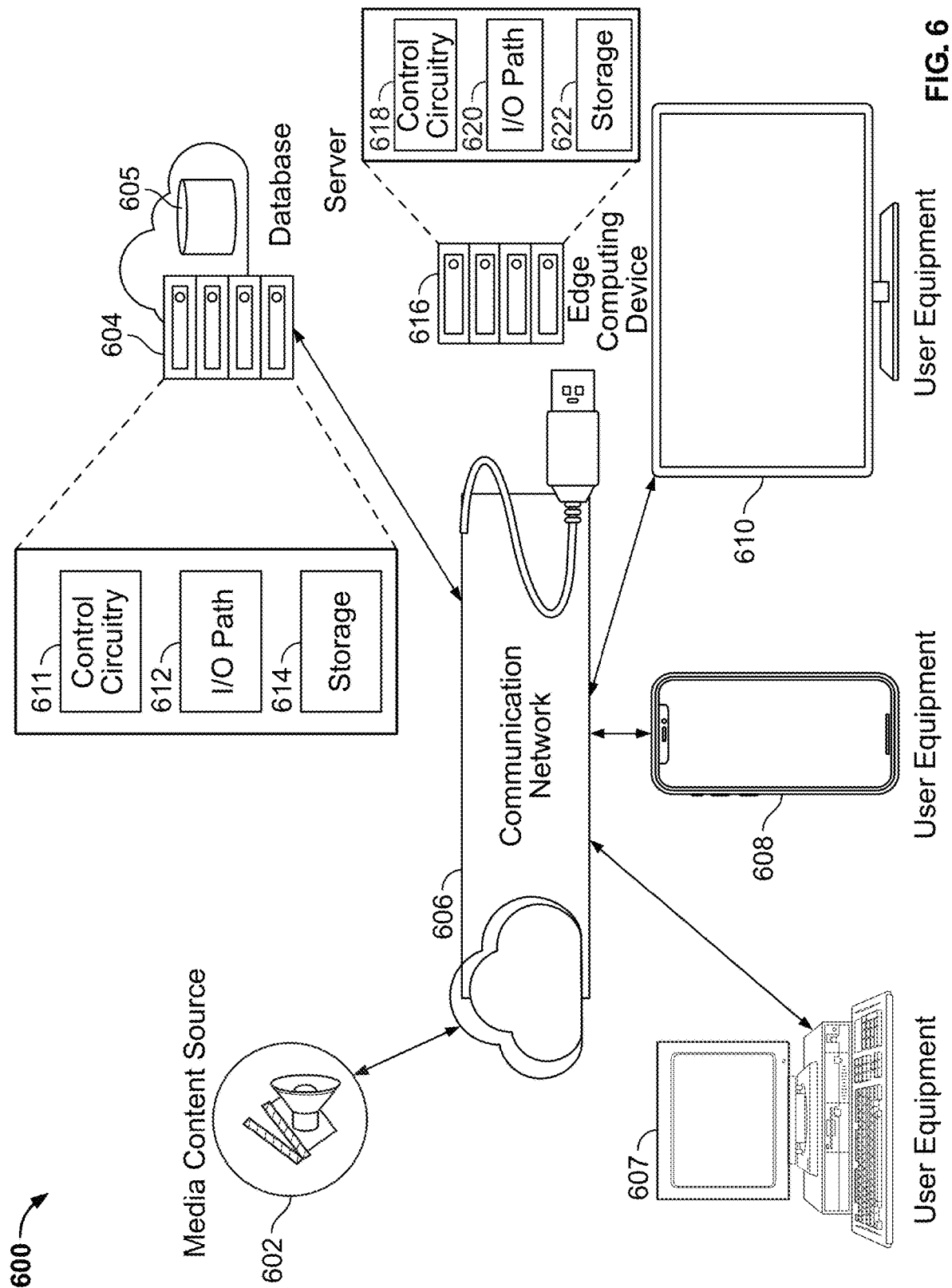
FIG. 6 shows a system, in accordance with some embodiments of this disclosure.

FIGS. 5-6 describe illustrative devices, systems, servers, and related hardware for AR generation. FIG. 5 shows generalized embodiments of illustrative user equipment devices 500 and 501, which may correspond to, e.g., computing devices 212, 260, 312, and 314. For example, user equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path 502 that may comprise I/O circuitry (e.g., network card, or wireless transceiver). I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the AR application stored in memory (e.g., storage 508). Specifically, control circuitry 504 may be instructed by the AR application to perform the functions discussed above and below. In some implementations, processing or actions performed by control circuitry 504 may be based on instructions received from the AR application.

In client/server-based embodiments, control circuitry 504 may include communications circuitry suitable for communicating with a server or other networks or servers. The AR application may be a stand-alone application implemented on a device or a server. The AR application may be implemented as software or a set of executable instructions. The instructions for performing any of the embodiments discussed herein of the AR application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the AR application may be a client/server application where only the client application resides on device 500 (e.g., device 104), and a server application resides on an external server (e.g., server 604 and/or server 616). For example, the AR application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing AR generation, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the AR application may instruct control 611 or 618 circuitry to perform processing tasks for the client device and facilitate the AR generation.

Control circuitry 504 may include communications circuitry suitable for communicating with a server, edge computing systems and devices, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as AR application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video AR generation data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. In particular, Camera 518 may be a camera as shown in FIG. 1 element 102. Camera 518 may be an analog camera that converts to digital images via a video card.

The AR application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide AR generation functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the AR application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the AR application may be downloaded and interpreted or otherwise run by an interpreter or virtual machine (run by control circuitry 504). In some embodiments, the AR application may be encoded in the ETV Binary Interchange Format (EBIF), received by control circuitry 504 as part of a suitable feed, and interpreted by a user agent running on control circuitry 504. For example, the AR application may be an EBIF application. In some embodiments, the AR application may be defined by a series of JAVA-based files that are received and run by a local virtual machine or other suitable middleware executed by control circuitry 504. In some of such embodiments (e.g., those employing MPEG-2 or other digital media encoding schemes), AR application may be, for example, encoded and transmitted in an MPEG-2 object carousel with the MPEG audio and video packets of a program.

FIG. 6 is a diagram of an illustrative system 600 for AR generation, in accordance with some embodiments of this disclosure. User equipment devices 607, 608, 610 (e.g., which may correspond to one or more of computing device 212 may be coupled to communication network 606. Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system, such as, for example, managed by mobile operator 206). In some embodiments, the AR application may be executed at one or more of control circuitry 611 of server 604 (and/or control circuitry of user equipment devices 607, 608, 610 and/or control circuitry 618 of edge computing device 616). In some embodiments, data structure 300 of FIG. 3, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide AR generation data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and video server 604 over communication network 606, and may be configured to perform processing tasks (e.g., AR generation) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
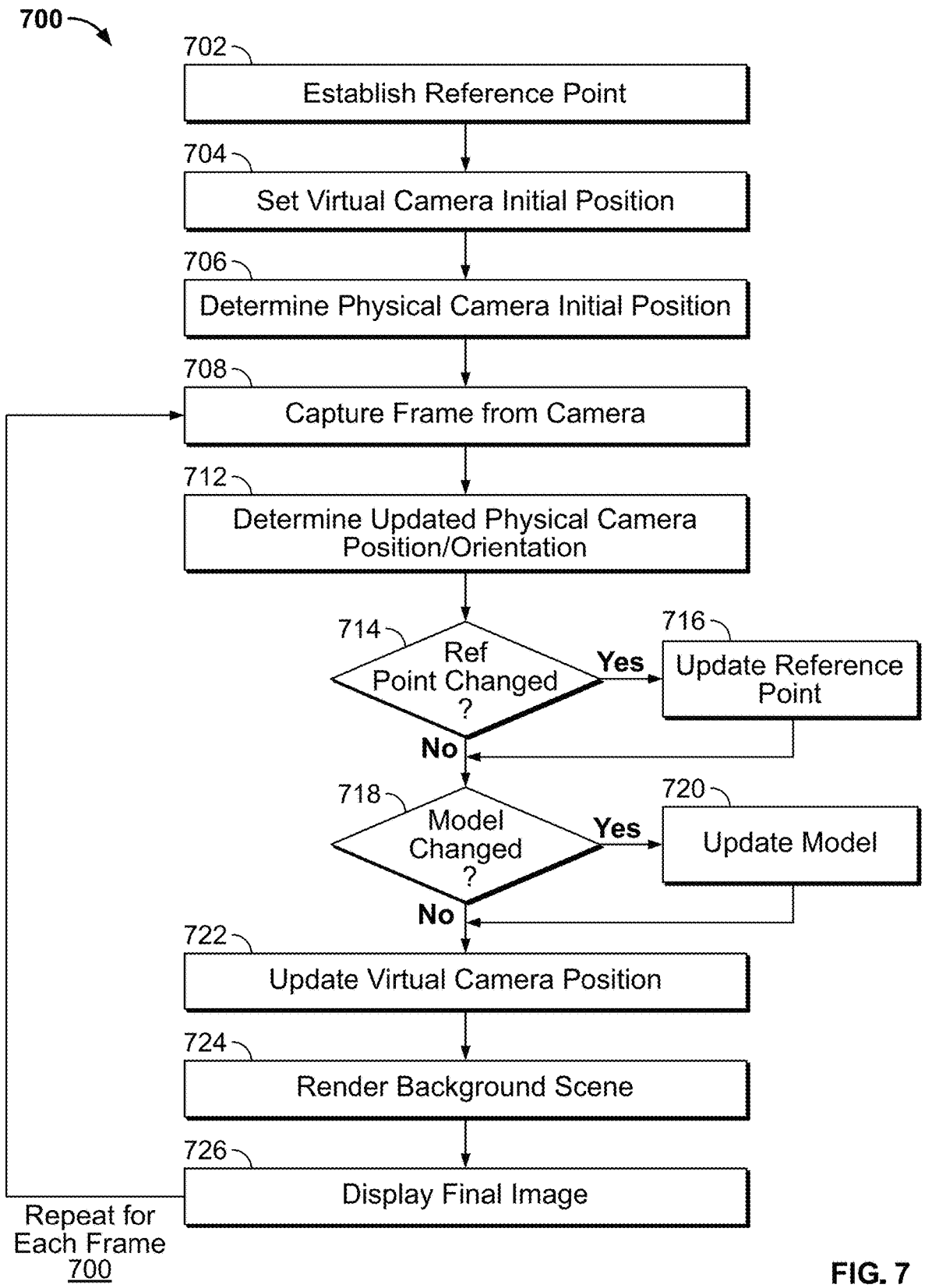
FIG. 7 is a flowchart of a detailed illustrative process for augmented reality image generation, in accordance with some embodiments of this disclosure.

FIG. 7 is a flowchart of a detailed illustrative process 700 for augmented reality image generation, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

As part of process 700, control circuitry (e.g., control circuitry 611, control circuitry 618, or control circuitry of any of devices 607, 608, or 610) may execute a series of steps to achieve generation of an AR image or video, e.g., as shown in any of FIGS. 1-4.

In some embodiments, steps 702-706 may be performed before control circuitry begins to record (e.g. using camera 102, 308, or 518). At step 702, the control circuitry establishes a reference for correlating a physical environment to an environment of a virtual model (e.g., model 302). For example, point 310 of FIG. 3 may be selected as a reference point.

At 704, the control circuitry sets virtual camera point within virtual environment. For example, the virtual camera point may be set in 3D coordinate system in relation to the reference point set at set 702. For example, the initial position of the virtual camera may set via user interface. In some embodiments, the initial position of the virtual camera may be position 314 of FIG. 3.

At 704, the control circuitry determines physical camera initial position and orientation within physical environment. This may be performed using one or more location determination techniques described above in relation to FIG. 3. For example, the location may be established using X, Y, Z coordinates and the orientation may be established using Pitch, Roll, Yaw measurements.

At 708, the control circuitry begins constructing a frame of a video, by using a physical camera to capture a video frame (e.g., in MPEG format). At 712, the control circuitry determines updated physical camera position and orientation in relation to physical camera position determined either at step 706 or the last time step 712 was performed. The magnitude of change in x direction may be denoted as $\Delta x$, magnitude of change in y direction may be denoted $\Delta y$, and the magnitude of change in y direction may be denoted $\Delta$. The magnitude in roll orientation may be denoted $\Delta r$, the magnitude in pitch orientation may be denoted $\Delta p$, the magnitude in yaw orientation may be denoted $\Delta yaw$.

At 714, the control circuitry may optionally perform a check of whether a reference point changed (e.g., based on time or user input to teleport). If so, the control circuitry may update the reference point in the 3D model in step 716. If not, the control circuitry proceeds to step 718.

At 718, the control circuitry may optionally check if the 3D model changed. For example, the control circuitry may check if 3D model is an animated model that changed its state due to a preselected time trigger or a UI request or based on a user input. In another example, the control circuitry may check if a second 3D model was substituted for the initial 3D model. If so, the control circuitry may update the 3D model in step 720. If not, the control circuitry proceeds to step 722. Steps 714, and 718 may be performed in reverse order or simultaneously. In some embodiments, steps 714, and 718 are optional and may be performed in any order or at the same time.

At 718, the control circuitry may perform an update to the position of virtual camera in relation to the reference point. For example, the control circuitry may determine an updated virtual camera position by taking the last known virtual camera position and modifying it proportion to the measured changes $\Delta x$, $\Delta y$, $\Delta z$. Additionally or alternatively, the control circuitry may determine an updated virtual camera position by taking the last known virtual camera orientation and modifying it proportion to the measured changes $\Delta r$, $\Delta p$, $\Delta yaw$. In some embodiment, the control circuitry may apply a scaling factor "scale." For example, each of $\Delta x$, $\Delta y$, $\Delta z$ may be multiplied by "scale" number (e.g. 7), Additionally, or alternatively, each of $\Delta r$, $\Delta p$, $\Delta yaw$ may be multiplied by "scale" number (e.g. 2 or 7, or any other suitable number).

At 724, the control circuitry may render a background for the current frame, from virtual camera perspective in relation to the 3D model. For example, this may be done using ray tracing as shown in FIG. 1 or any other rendering technique. The rendered image may be used to preform chroma key substitution in the frame captured at step 708, At 724, the control circuitry may display and/or store the final frame in memory (e.g. in storage 622). In the control circuitry may cast the final frame to display on another device, e.g. using I/O path 620. Process 700 may then return to step 708 and repeat the process for the next frame. In some embodiments, the control circuitry may display the final frames in real as the process 700 is occurring. That is the frames (after the processing performed by process 700) are displayed simultaneously with capture of frames (e.g., at step 708). In this case, the frames of a video may be displayed on display of the device performing the frame capture (e.g., display 512 of any of devices 607, 608, and 610). In some embodiments, the frames of the video may be cast to any other device, e.g., over network 606.

FIG. 8 shows another exemplary implementation of augmented reality image generation, in accordance with some embodiments of this disclosure. FIG. 8 illustrate an optional modification to techniques described in FIGS. 1-4, by addition of one more foreground objects into AR image generate using a physical camera 814 and background (e.g., green screen 806). In some embodiments, the AR application may access 3D model 802 that acts as a background for a mid-field physical object 810 in the similar way as model 122 acts as background in FIG. 1. In addition, the AR application may also access several 3D models defined as foreground objects in the virtual environment. For example, 3D models 804, 808, and 812 may be used by the AR application to perform foreground compositing.

Foreground Compositing

Foreground compositing is the process of adding by the AR application of computer-generated objects (e.g., objects 804, 808, and 812) that are not part of the background 802. One or more of these objects may appear to be in front of mid-field objects (e.g., object 810), and thus occlude them. In another embodiment, one or more of these objects may be positions between the mid-field objects and the background, in which case they themselves are occluded by mid-field objects.

The AR application may determine how each of the foreground objects 804, 808, and 812 should be composited based on analysis of geometry and distances between the physical camera 814 and the mid-field objects (e.g., object 810), such as physical actors and objects, the distance to the green screen 804, as well as the intended virtual placement of any foreground objects 804, 808, and 812. For example, in a video intending to depict another planet, a virtual object such as an alien 812 or spacecraft 808 may appear in front of the image of the physical user 810 (thus occluding him or her) as physical user 810 moves through the scene. If the user 810 moves closer to the camera 814, the AR application may detect a change in the geometrical relationship between mid-field objects 810 and any one of virtual object 804, 808, and 812 such that the object should now appear behind the mid-field objects 810 (and thus be occluded by the mid-field objects 810).

In some embodiments, any such "foreground" objects that have a virtual position "behind" the green screen 804 (e.g., object 804) can always be rendered as a part of the background 802, since there is no chance that they occlude any mid-field objects (e.g., object 810). To achieve this effect, the AR application may associate a virtual position with each foreground object so that the depth ordering of it with respect to any mid-field objects can be determined.

In one approach, the AR application may construct a data structure containing a list of foreground objects 804, 808, and 812 (and any other). Each node of this data structure may comprises the 3D model of respective foreground object 804, 808, and 812, which will be used by the AR application to render it, as well as the virtual location of that object within the coordinate system of the 3D model 802 used for background compositing (e.g., in relation to the reference point, such as 310). This position may be updated by UI input or a computer process, allowing it to appear to move throughout the virtual environment.

FIG. 8, illustrates a mix of background virtual scene 802 (dark grey landscape), a physical actor 810 in front of the green screen 804 (denoted by the face) and a collection of virtual foreground objects (804, 808, and 812) at various distances. The rocket 808 is at a greater distance in the virtual environment than the image of actor 810 and thus is occluded in the final image 816, while the robot 812 is in front of the image of the actor 810 and thus is rendered over him or her in the final image 816. The star's 804 current virtual distance places it "behind" the green screen 806, and thus it may be considered as part of the background 3D model 802, since it cannot interact with mid-field objects 810, but yet might occlude (or be occluded by) virtual objects as part of the background model 802.

Figure 9:
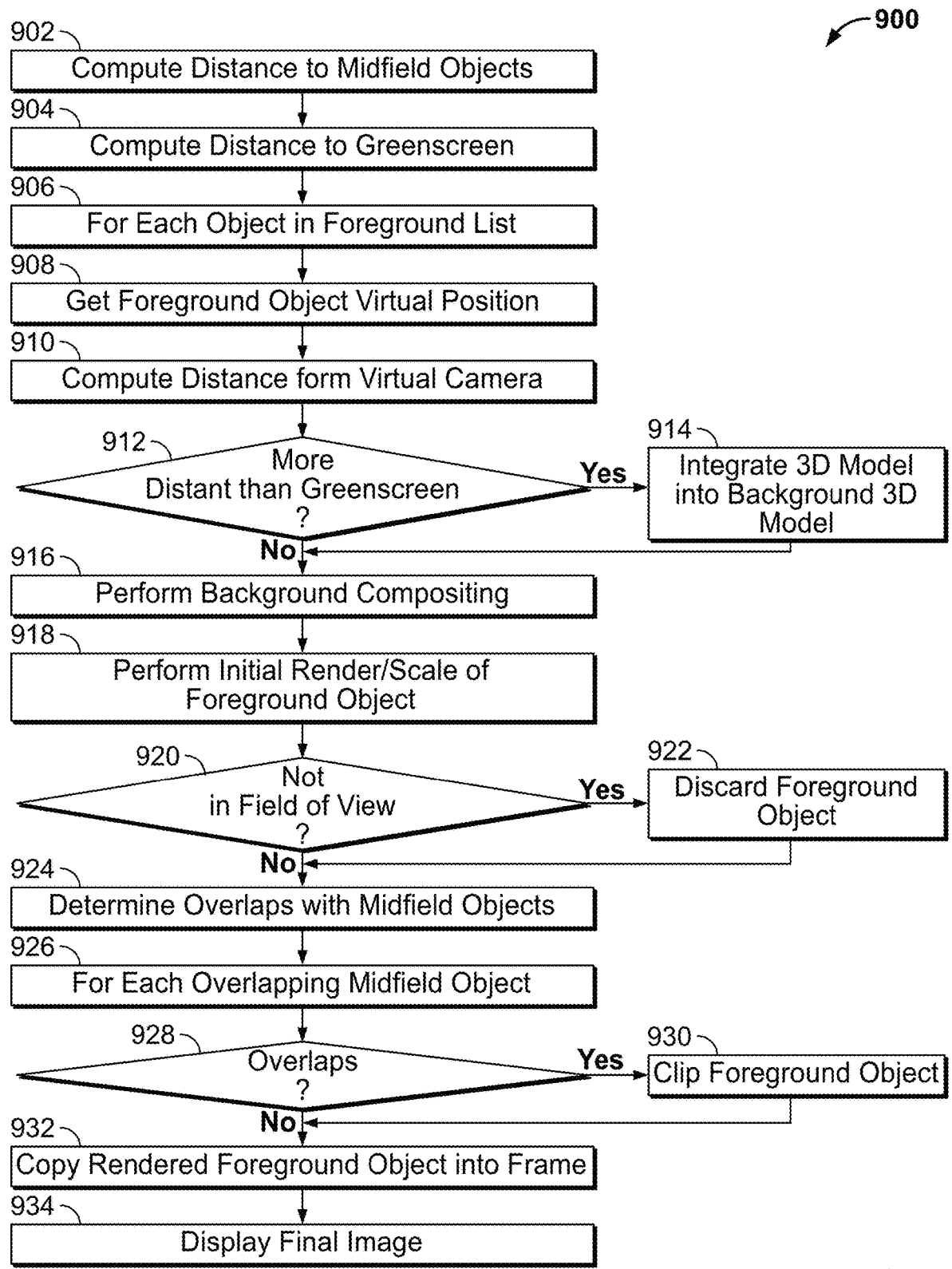
FIG. 9 is a flowchart of a detailed illustrative process for augmented reality image generation, in accordance with some embodiments of this disclosure.

FIG. 9 is a flowchart of a detailed illustrative process 900 for performing augmented reality image generation (e.g., foreground compositing), in accordance with some embodiments of this disclosure. In various embodiments, the individual steps of process 900 may be implemented by one or more components of the devices and systems of FIGS. 1-6. Although the present disclosure may describe certain steps of process 900 (and of other processes described herein) as being implemented by certain components of the devices and systems of FIGS. 1-6, this is for purposes of illustration only, and it should be understood that other components of the devices and systems of FIGS. 1-6 may implement those steps instead. Process 900 may be performed after or in addition to process 700 to achieve foreground compositing (e.g., as describe in FIG. 8).

At 902, the control circuitry, at the time of capture of each frame (e.g. by camera 518 or 814), system computes the distance from the physical camera to any mid-field objects (e.g., 810) in the scene as well as from the physical camera to the green screen (e.g., 806).

Then the control circuitry may perform steps 908-932 for each foreground object in a foreground data structure (e.g., as stored in storage 622).

At step 908, the control circuitry retrieves the position of a foreground object from the data foreground data structure. At step 910, the control circuitry computes the distance to that object from the current location of the virtual camera.

At step 912, the control circuitry checks if the object's distance puts it further away than the green screen. If so, then at step 914, the control circuitry integrates that object into background model (e.g., model 802). In this way the control circuitry may perform the background compositing using modified background model (e.g., as described above in FIG. 7). For example, this may cause the object to occlude or be occluded by virtual background elements.

If the object's distance does not put it further away than the green screen, the system may perform additional steps 918-932.

At 918 the control circuitry may perform an initial rendering of that object (e.g., by scaling that rendering of the foreground object based on the distance from the virtual camera). Step 918 yields a rendered image of the object, for the current frame at the correct size. At 920, the control circuitry may check whether the rendered foreground object is in the field of view of the virtual camera. If not, the control circuitry may discard the render at step 922.

At 918 the control circuitry determines which mid-field objects overlap or intersect with the current foreground object (e.g., object 810). Steps 926-932 may be performed for such objects. At step 928, the control circuitry determines that a particular object overlaps with an image of a mid-field physical object. In case the particular foreground object is behind (or partially behind) any mid-field object, the particular foreground object is clipped to remove pixels that overlaps from the particular foreground object at step 930. At step 932, if the foreground object is in front of all mid-field objects, then it is copied into the scene over the top of those mid-field objects. This yields the rendering of the final frame that may be displayed or stored at step 934.

Through the process 900, the AR application allows for creation of virtual objects that appear to be in the foreground of the scene, where they can pass in front of or behind physical objects in the scene. Further, these objects correctly occlude (and are occluded by) those physical objects. Still further, this application allows "foreground" objects to also exist in the computer-rendered background of the scene, where they may correctly occlude (or be occluded by) virtual background objects. Foreground objects can vary their virtual positions to transition between any of these states on a frame-by-frame basis, for example, allowing virtual objects to "fly out" of the background rendered scene, pass behind and then in front of physical actors and objects. These virtual objects may be created at pre-production time (for example, alongside the creation of the virtual background 3D model). For example, 3D modeling tool UI interface may be provided to create the models for the foreground objects, to establish when these objects should appear, and to establish their paths of motion, and depth placement (e.g., in relation to a reference point). Alternatively, the foreground objects may be created via a computer-generated process, such as a simulation that generates new objects such as game characters and integrates them into the foreground.

In some embodiments, the steps, as described above in FIGS. 1-9, are performed by a single device (e.g., an end user computing device used to generate an AR video such a cell phone 608). In such embodiments, the same device captures the video frames and perform virtual camera adjustments, performs the chroma key replacement, and inserts the foreground elements.

In some embodiments, some or all of these functions may be carried out by one or more remote devices (e.g., by server 604). In one approach, a separate remote device (e.g., server 608) performs the rendering and supplies the resulting rasterized image to the end device (e.g., device 608) that generates the AR presentation. In this approach, for example, a more powerful server (e.g., a remote server) with more high-end graphics cards may be used to generate a much more complex scene to relieve some computation demand from the end device. The rendered image may then be transmitted to the end device for compositing. In another approach, remote rendering could be done at the mobile network edge (e.g., edge device 616), such as in a mini datacenter or cloudlet equipped with one or more GPUs.

In some embodiments, the foreground object data structure and the depth map of relative positions would be transmitted to the remote server by the end device, such that the scene could be rendered with proper occlusions by the server. One or more rendered images (such as one for the background and one or more for any un-occluded foreground objects) would then be transmitted to the phone for final compositing. In some embodiments, any portion of the process 700 or 900 may be offloaded to a remote device.

In some embodiments, the end device may not fully render the final composed image, but may instead render lower-end "preview" graphics in real-time. In this approach, the "preview" graphics are rendered and displayed on the end device in real-time, as described above (e.g., by rendering the final image in lower resolution). In this approach, the end device may, for each frame captured by the camera, retain the original image, and data for the camera position/ orientation for that frame.

In this approach, the end device or a remote server performs final, more complex, rendering of any background and foreground elements offline to create the final video according to any of methods describe above.

In this approach, the AR application provides a user interface that allows for framing adjustments, by displaying "preview quality" at capture time. At the end of the shooting, the captured data may be transmitted to an offline renderer (e.g., at a server 604) where a final video file is assembled with much higher quality graphics.

Figure 10:
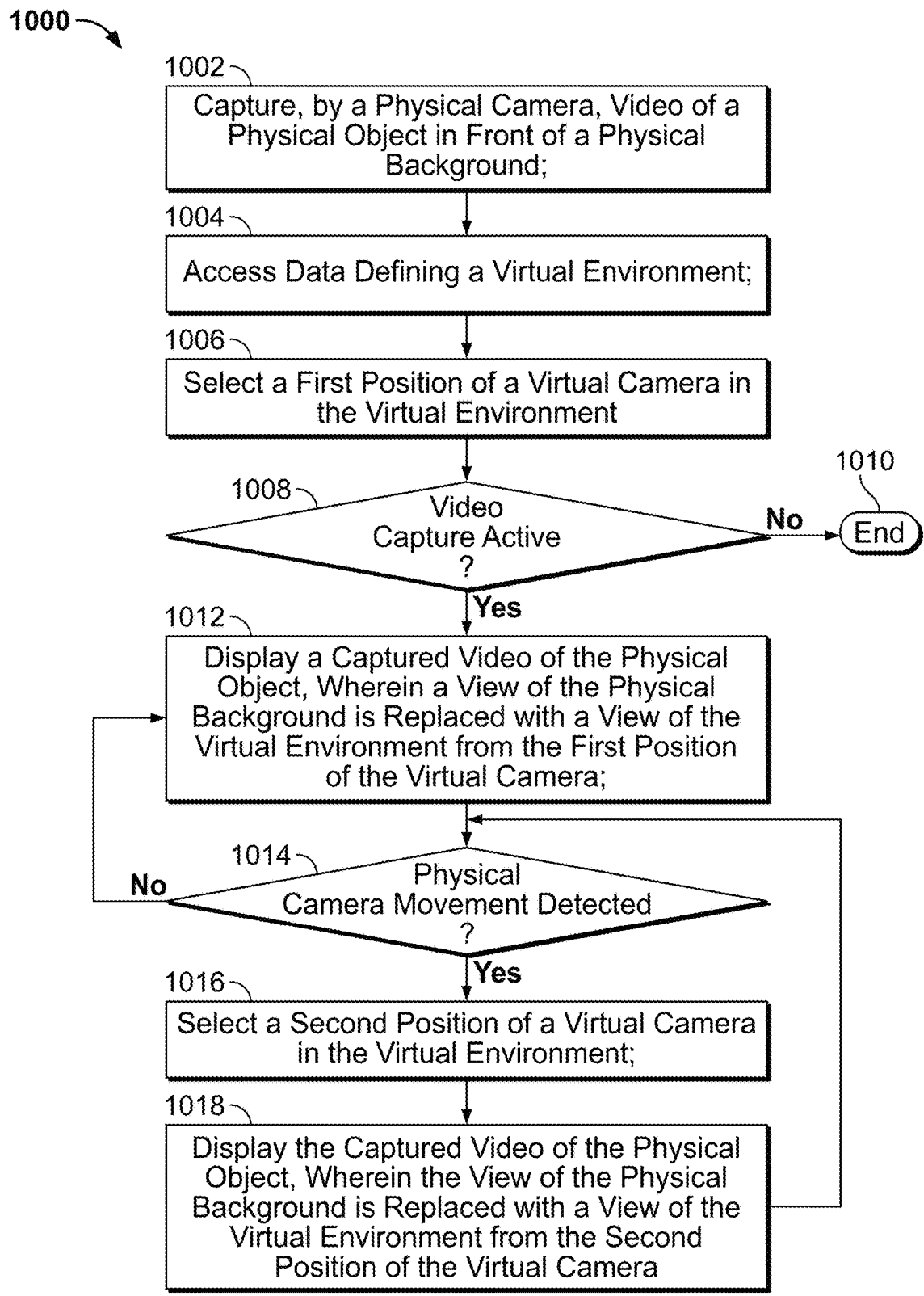
FIG. 10 is a flowchart of another detailed illustrative process for augmented reality image generation, in accordance with some embodiments of this disclosure.

FIG. 10 is a flowchart of a detailed illustrative process 1000 for performing augmented reality image generation, in accordance with some embodiments of this disclosure. In various embodiments, the individual steps of process 1000 may be implemented by one or more components of the devices and systems of FIGS. 1-6. Although the present disclosure may describe certain steps of process 1000 (and of other processes described herein) as being implemented by certain components of the devices and systems of FIGS. 1-6, this is for purposes of illustration only, and it should be understood that other components of the devices and systems of FIGS. 1-6 may implement those steps instead.

At step 1002, the control circuitry captures, by a physical camera (e.g., camera 519), a video of a physical object in front of a physical background (e.g. green screen or pixels that do not include an image of a detected human.) An example, of such an exemplary capture is shown by elements 102, 103 and 104 of FIG. 1.

At step 1004, the control circuitry accesses data defining a 3D model, e.g., in memory 622.

At step 1006, the control circuitry selects a first position for a virtual camera in a virtual embodiment defined by the 3D model. If the video capture is ongoing (as checked at step 1008 by the control circuitry), the process continues at step 1012, otherwise, the recording ends at step 1010.

At step 1012, the control circuitry, display (and/or stores) a captured video of the physical object, wherein a view of the physical background is replaced (e.g., with a chroma key replacement) with a view of the virtual environment from the first position of the virtual camera.

At step 1014, the control circuitry checks if the positions of the physical camera changed (e.g., using techniques described in relation to FIG. 3). If not, the control circuitry returns to step 1012 and continues to replace the background with a view of the virtual environment from the first position of the virtual camera.

If the physical camera's position changed, the control circuitry proceeds to step 1016. At step 1016, the control circuitry selects a second position of a virtual camera in the virtual environment. For example, the position and the orientation may be changed in proportion to physical distance change (e.g., measure from a reference point in the virtual environment as describe in relation to FIG. 3). At step 1018, the control circuitry may display and/or store (e.g., in memory 622) the captured video of the physical object, wherein the view of the physical background is replaced with a view of the virtual environment from the second position of the virtual camera. Steps 1012-1018 may be repeated for a third position based on further changes or indeed for any number of camera changes, The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel.

In addition, the systems and methods described herein may be performed in real time. It should also be noted that the systems and/or methods described above may be applied to, or used in accordance with, other systems and/or methods.

What is claimed is:

1. A method comprising:
capturing, by a physical camera, video of a physical object in front of a physical background;
accessing data defining a virtual environment;
selecting a first position of a virtual camera in the virtual environment;
while capturing the video:
displaying a captured video of the physical object, wherein a view of the physical background is replaced with a view of the virtual environment from the first position of the virtual camera;
in response to detecting a movement of the physical camera:
selecting a second position of the virtual camera in the virtual environment based on the detected movement;
displaying the captured video of the physical object, wherein the view of the physical background is replaced with a view of the virtual environment from the second position of the virtual camera.

2. The method of claim 1, further comprising:
determining a third position of a virtual object in the virtual environment;
wherein the displaying the captured video of the physical object further comprises displaying a view of the virtual object in the third position from the first position of the virtual camera.

3. The method of claim 2, wherein the display of the captured video of the physical object in response to detecting the movement of the camera comprises displaying the view of the virtual object in the third position from the second position of the virtual camera.

4. The method of claim 1, wherein the physical background is replaced with the view of the virtual environment using chroma key compositing.

5. The method of claim 1, wherein the view of the virtual environment from the first position of the virtual camera is generated by rendering a three-dimensional environment from a perspective of the first position.

6. The method of claim 1, wherein the first position of the virtual camera is selected via user interface input.

7. The method of claim 1,
wherein selecting the second position of the virtual camera comprises:
calculating a distance of movement of the physical camera; and
selecting the second position of the virtual camera in the virtual environment by moving the virtual camera in the virtual environment by a distance calculated based on the distance of movement of the physical camera and a scaling factor.

8. The method of claim 7, wherein the scaling factor is selected via user interface input.

9. The method of claim 1, further comprising modifying the virtual environment based on user interface input.

10. The method of claim 9, further comprising modifying the virtual environment based preselected time trigger.

11. A system comprising:
a physical camera configured to capture video of a physical object in front of a physical background; and
a control circuitry configured to:
access data defining a virtual environment;
select a first position of a virtual camera in the virtual environment; and
while the physical camera is capturing the video:
cause a display of a captured video of the physical object, wherein a view of the physical background is replaced with a view of the virtual environment from the first position of the virtual camera; and
in response to detecting a movement of the physical camera:
select a second position of the virtual camera in the virtual environment based on the detected movement; and
cause a display of the captured video of the physical object, wherein the view of the physical background is replaced with a view of the virtual environment from the second position of the virtual camera.

12. The system of claim 11, wherein the control circuitry is further configured to:
determine a third position of a virtual object in the virtual environment;
causing a display of a view of the virtual object in the third position from the first position of the virtual camera.

13. The system of claim 12, wherein the control circuitry is further configured to cause the display of the captured video of the physical object in response to detecting the movement of the camera by causing a display the view of the virtual object in the third position from the second position of the virtual camera.

14. The system of claim 11, wherein the control circuitry is further configured to replace the physical background with the view of the virtual environment using chroma key compositing.

15. The system of claim 11, wherein the control circuitry is further configured to generate the view of the virtual environment from the first position of the virtual camera by rendering three-dimensional environment from a perspective of the first position.

16. The system of claim 11, wherein the first position of the virtual camera is selected via user interface input.

17. The system of claim 11,
wherein the control circuitry is further configured to select the second position of the virtual camera by:
calculating a distance of movement of the physical camera; and
selecting the second position of the virtual camera in the virtual environment by moving the virtual camera in the virtual environment by a distance calculated based on the distance of movement of the physical camera and a scaling factor.

18. The system of claim 17, wherein the scaling factor is selected via user interface input.

19. The system of claim 11, wherein the control circuitry is further configured to modifying the virtual environment based on user interface input.

20. The system of claim 19, wherein the control circuitry is further configured to modify the virtual environment based preselected time trigger.

* * * * *